United States Patent [19]

Davis

[11] 4,157,549
[45] * Jun. 5, 1979

[54] DOPPLER RADAR MODULE

[75] Inventor: John W. Davis, San Diego, Calif.

[73] Assignee: Radar Control Systems, San Diego, Calif.

[*] Notice: The portion of the term of this patent subsequent to Aug. 16, 1994, has been disclaimed.

[21] Appl. No.: 801,639

[22] Filed: May 31, 1977

Related U.S. Application Data

[63] Continuation-in-part of Ser. No. 584,109, Jun. 5, 1975, Pat. No. 4,042,934.

[51] Int. Cl.² .......................... G01S 9/42; H01Q 13/06
[52] U.S. Cl. ................................. 343/786; 343/5 PD; 333/113
[58] Field of Search ............... 343/702, 703, 786, 858, 343/5 PD; 333/10

[56] References Cited

U.S. PATENT DOCUMENTS

| | | | |
|---|---|---|---|
| 3,747,109 | 7/1973 | Corbell | 343/702 |
| 3,806,942 | 4/1974 | Preti | 343/702 |
| 4,042,934 | 8/1977 | Davis | 343/786 |

Primary Examiner—Eli Lieberman
Attorney, Agent, or Firm—Frank D. Gilliam

[57] ABSTRACT

A doppler radar module consisting of transmitting and receiving diodes disposed within adjacent sections of waveguide with the transmitter diode disposed a half wavelength away from a shorting end of the transmitter section of waveguide and a receiver diode disposed a quarter wave from a shorting end of the receiver portion of the waveguide. The receiver section and the transmitter section of the waveguide being separated by a common wall; a coupling aperture disposed in the common wall for coupling a small portion of transmitter energy into the receiver portion of the waveguide and for coupling a maximum of reflected energy into the receiver of waveguide section.

10 Claims, 16 Drawing Figures

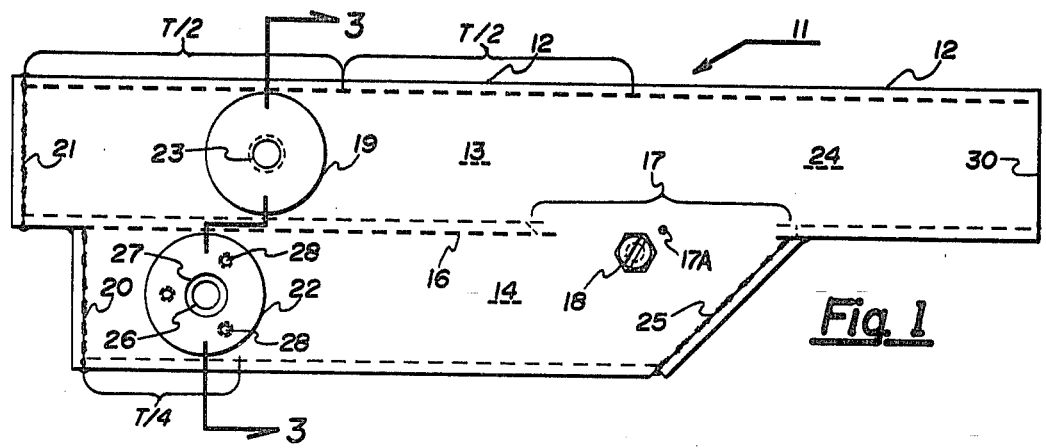
Fig. 1
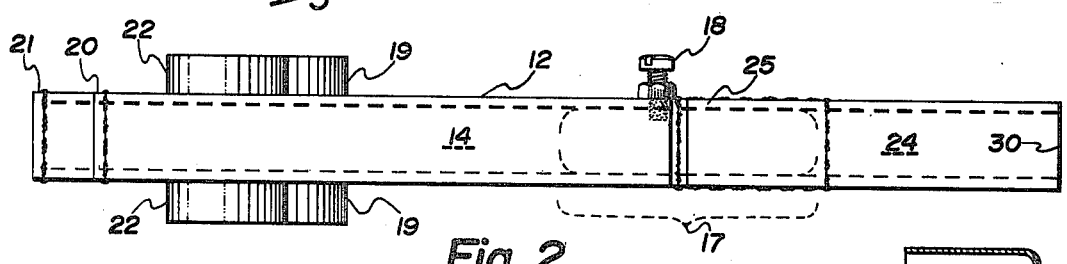
Fig. 2
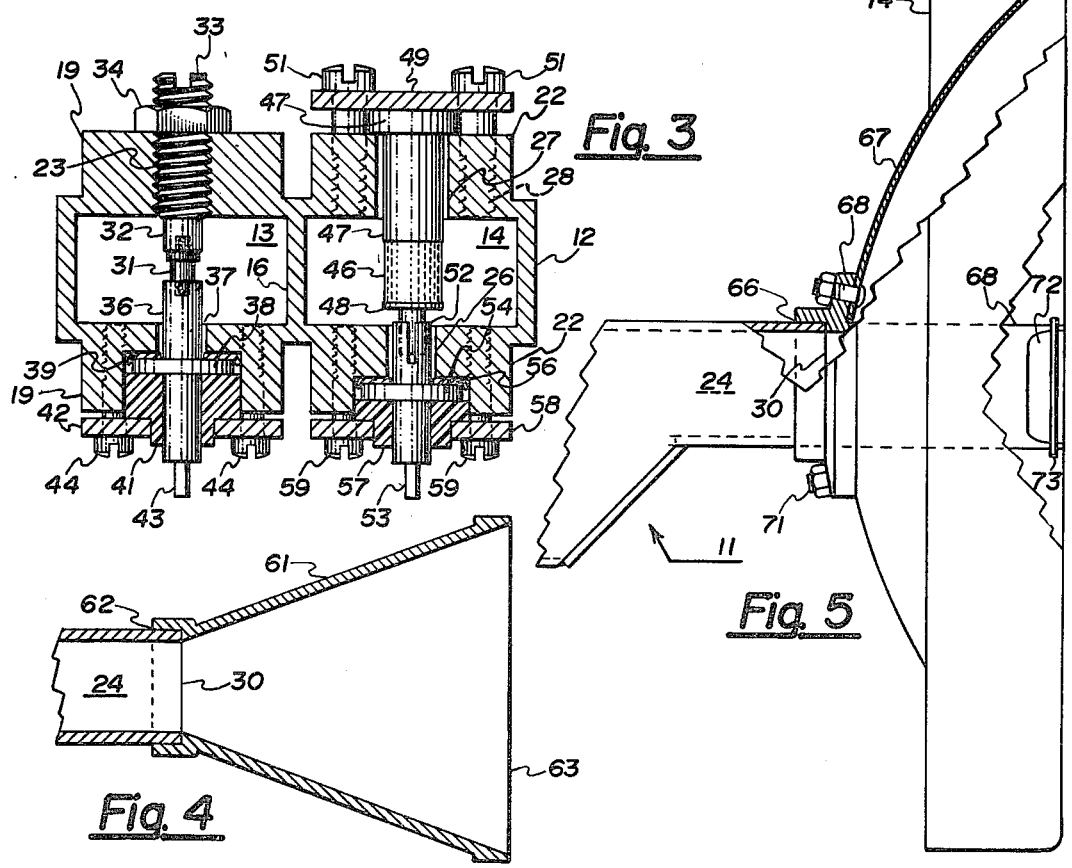
Fig. 3
Fig. 4
Fig. 5

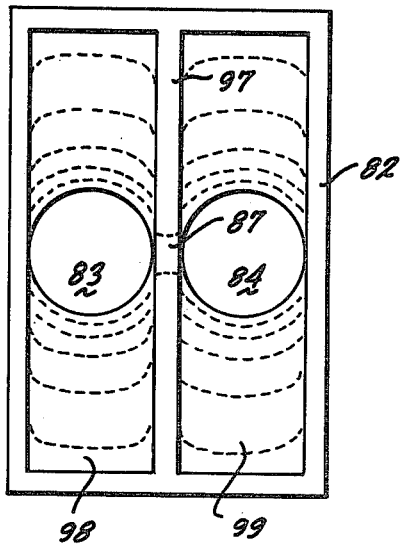
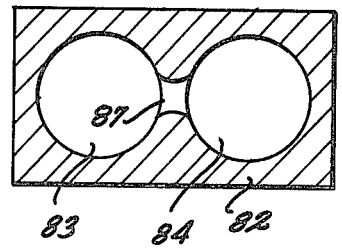
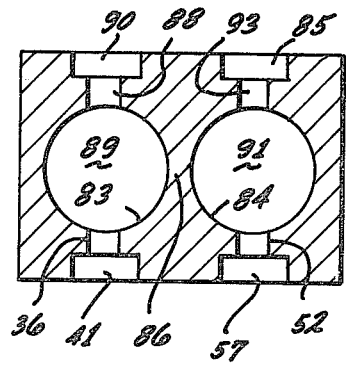
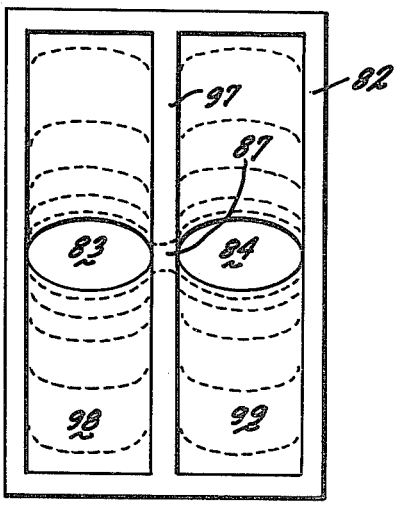
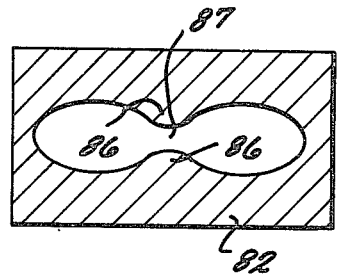
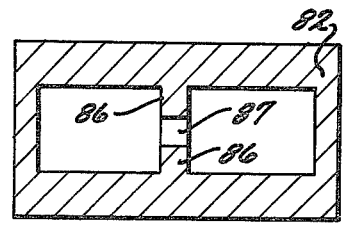
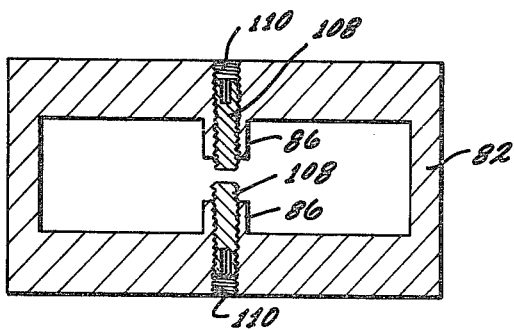

DOPPLER RADAR MODULE

BRIEF DESCRIPTION OF THE INVENTION

This application is a continuation in part of application Ser. No. 584,109 filed June 5, 1975, now Pat. No. 4.042,934.

The present invention relates to a doppler radar module and more particularly to a doppler radar module in which a transmitter diode and a receiver diode are disposed in adjacent sections of waveguide with aperture coupling therebetween.

According to the invention, a doppler radar module is provided in which transmit and receive waveguide sections are divided by a common dividing wall with a diode transmitter disposed within the transmit section and a diode receiver disposed with the receiver section. The transmitter diode is disposed an even number of quarter wavelengths of the transmission frequency from the shorting end of the transmit waveguide section and the receiver diode an odd number of quarter wavelengths from the shortening end of the receive waveguide section. A coupling aperture is disposed in the dividing wall. Reflected energy will thereby be directed through the aperture to the receiver section of waveguide. Typically, the transmit diode is disposed a half wavelength from the shorting end wall of the transmit section of the waveguide, and the receiver diode is disposed a quarter wavelength from the shorting end wall of the receiver section of the waveguide. A tuning element can be inserted in the waveguide in the vicinity of the aperture for fine tuning the aperture coupling or a course adjustment means may be provided for varying the physical cross-sectional size of the aperture. Hence, a selected amount of transmitted energy is coupled into the receiving diode which acts as a mixer for a heterodyne (homodyne) action with the selected amount of transmitted energy received therein. The output of the waveguide can be split or common as dictated by the applications of the system.

An object of the present invention is the provision of a compact doppler radar module.

Another object of the invention is the provision of a compact radar module with adjacent transmitter and receiver sections.

A further object of the invention is the provision of a doppler radar module having a simplified waveguide transmission system utilizing any type of RF waveguide.

Yet another object of the invention is the provision of a doppler radar module which is inexpensive to manufacture and assemble and convenient in operation.

Other objects and many of the attendant advantages of the present invention will be readily appreciated when considered in connection with the accompanying drawings in which like reference numerals designate like parts throughout the Figures thereof and Wherein:

FIG. 1 is a top view of a preferred embodiment of the present invention;

FIG. 2 is a side elevational view of the embodiment of FIG. 1;

FIG. 3 is a sectional view taken along lines 3—3 of FIG. 1 illustrating the transmit and receive components of the embodiment of FIG. 1;

FIG. 4 is a cross-sectional view of a horn radiator utilized in conjunction with the embodiment of FIG. 1;

FIG. 5 is a side elevational view, partially sectioned, of a dish type radiator utilized with the embodiment of FIG. 1;

FIG. 10 is a front elevational view of an embodiment of FIG. 6 employing circular waveguide;

FIG. 11 is a sectional view taken along lines 11—11 of the embodiment of FIG. 6 employing circular waveguide;

FIG. 12 is a sectional view taken along lines 12—12 of FIG. 6 illustrating the transmit and receive components of an embodiment of FIG. 6 employing circular waveguide;

FIG. 13 is a front elevational view of an embodiment of FIG. 6 employing elliptical waveguide;

FIG. 14 is a sectional view taken along lines 14—14 of an embodiment of FIG. 6 employing elliptical waveguide;

FIG. 15 is a sectional view taken along lines 15—15 of an embodiment of FIG. 6 employing rectilinear waveguide; and FIG. 16 is showing of FIG. 15 with an aperture size adjusting means.

DETAILED DESCRIPTION OF THE DRAWING

Figure 6:
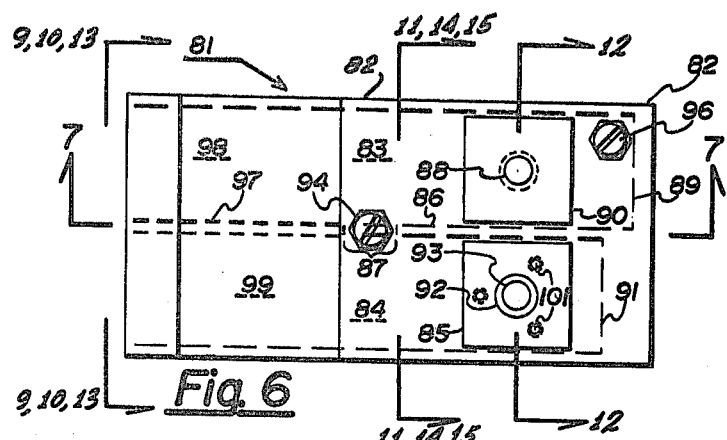
FIG. 6 is a top view of a modification of the embodiment of FIG. 1.

Referring to FIGS. 1 and 2, a transmit-receive module is shown generally at 11 having a basic casting 12 with a transmitter waveguide section 13 and a receiver waveguide section 14 with a common dividing wall 16 therebetween. Although this embodiment is shown utilizing rectilinear waveguide for ease of explanation it should be understood that any configured waveguide having the same or similar RF characteristics may be employed to practice the invention. A coupling aperture 17 is disposed in common wall 16 and has an adjusting screw 18 in immediate proximity thereto. Transmitter mounting boss 19 is disposed within transmitter waveguide section 13 approximately one half wavelength from a transmitter back plate shorting surface 21 in transmit waveguide section 13. Receiver mounting boss 22 is disposed within receiver waveguide section 14 approximately one quarter wavelength away from receiver back plate shorting surface 20. Transmitter mounting boss 19 has a threaded bore 23 therein for receiving the transmitter diode assembly as will be discussed with reference to FIG. 3. Center point 17A of aperture 17 is located at least one half wavelength from transmitter mounting boss mounting bore 23. A common waveguide section 24 is disposed after coupling aperture 17. Receiver mounting boss 22 has a lower bore 26 and an upper bore 27 therein. Mounting holes 28 are disposed within receiver mounting boss 22. Waveguide section 25 consists of a 45 degree short for optimizing transmission characteristics. Common waveguide section 24 terminates at a port 30.

Referring to FIG. 3, transmitter diode 31 is carried by upper diode mount 32 which terminates in an upper diode clamp screw 33 threadably engaged with threaded bore 23. Upper diode clamp screw 33 is threadably engaged with lock nut 34 which is in contact with a top surface of transmitter mounting boss 19.

Transmitter diode 31 is also carried by a lower diode mount 36 disposed within lower mount aperture 37 and carried by bypass disc 38. Transmitter bypass dielectric 39 is disposed between radio frequency bypass disc 38 and a portion of transmitter mounting boss 19. Insulating clasp 41 is disposed between mount bypass disc 38 and transmitter clamp plate 42. Transmitter external contact 43 extends from lower diode mount 36. Transmitter clamp screws 44 are in threadable engagement with mounting bores in transmitter mounting boss 19 and transmitter clamp plate 42 to transmitter insulating clamp 41 clamping the transmitter portion of transmission waveguide section 13.

Receiver diode window 46 is disposed between upper receiver contact 47 and lower receiver contact 48. Upper receiver contact 48 is clamped by upper receiver clamp plate 49, which is held in place via clamp screws 51. Receiver diode window 46 is disposed within a portion of receiver waveguide section 14 which is defined by the inner surfaces of receiver mounting boss 22. Upper receiver contact 47 is received within upper bore 27 and lower receiver contact 48 is coupled through coupling sleeve 52 to external contact 53 through receiver radio frequency bypass disc 54. Dielectric 56 is disposed between receiver radio frequency bypass disc 54 and receiver mounting boss 22. Insulating clamp 57 is disposed between coupling sleeve 52 and mounting boss 22 and carries coupling sleeve 52 and mounting boss 22 and carries coupling sleeve 52 in the central aperture therein. Insulating clamp 57 is clamped via clamp plate 58 and clamp screws 59 which are in threadable engagement with receiver mounting boss 22.

Referring to FIG. 4, coupling port 30 of waveguide section 24 is coupled to antenna horn 61 via antenna horn port coupling 62. Antenna horn 61 has a terminating aperture 63.

Referring to FIG. 5, a dish adapter port coupling 66 couples dish reflector 67 to waveguide port 30 of waveguide section 24 and carries a dish adapter section 68 with mounting apertures for reflector mounting hardware 71. Primary antenna port 72 is carried by antenna splash plate 73. Dish reflector 67 terminates in a stiffening flange 74 around the periphery thereof.

Figure 7:
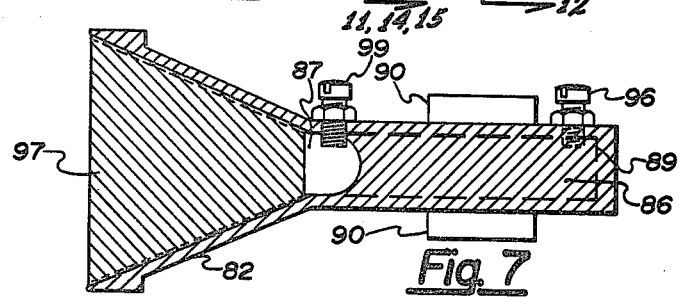
FIG. 7 is a sectional view taken along lines 7—7 of FIG. 6.
Figure 8:
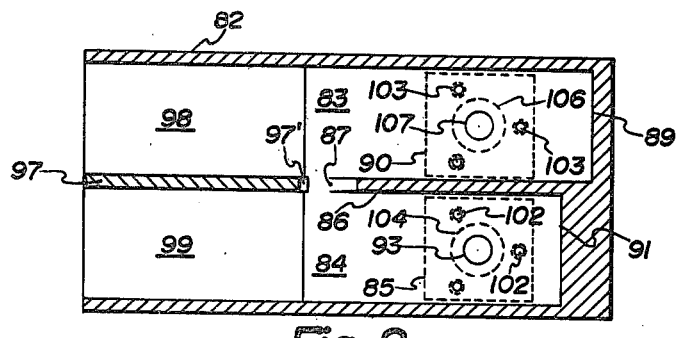
FIG. 8 is a sectional view showing the bottom view of the FIG. 6 showing.
Figure 9:
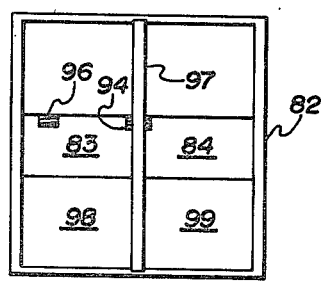
FIG. 9 is a front elevational view of the embodiment of FIG. 6 utilizing rectilinear waveguide.

Referring to FIGS. 6 and 7, a double section horn module is shown generally at 81 having a waveguide casting 82 with a transmit section 83 and a receive section 84, separated by a common wall or partition 86. Although this embodiment, like the first embodiment, is shown constructed of rectilinear waveguide it should be understood that any configured waveguide having the same or similar radio frequency characteristics may be employed to practice the invention. Aperture 87 is disposed within wall 86. Transmitter mounting boss 90 is disposed within transmitter waveguide section 83 and has a mounting aperture 88 which is disposed approximately one half wavelength of the transmission frequency from shorting end surface 89. Receiver boss 85 has an upper mounting port which is disposed substantially one quarter wavelength of the transmission frequency from back shorting wall 91. A lower aperture is shown at 93. Aperture coupling adjustment screw 94 is shown disposed within coupling aperture 87. Fine tuning screw 96 is shown disposed between transmitter boss 90 and back shorting surface 89 within waveguide section 83. Horn septum 97 divides a transmission section 98 communicating with waveguide section 83 and receiving section 99 communicating with receiving waveguide section 84. Mounting holes 101 and 102 and receiver disc cavity 104 are disposed within receiver mounting boss 84. Lower mounting holes 103 and transmitter disc cavity 106 are disposed within transmitter mounting boss 90.

FIGS. 10 and 13 show a transition from a curvilinear waveguide section to a rectilinear horn as shown in the various FIGS. This is the preferred embodiment when utilizing curvilinear waveguide, however, curvilinear horns (not shown) or dish type radiators shown in FIG. 5 may be utilized equally as well to practice the invention.

Referring now to FIG. 16, it can be seen that the fine tuning aperture adjustment 97 may be eliminated and aperture size adjustment means for physically changing the aperture size may be employed. The aperture size adjustment means shown is a pair of opposed screws 108 threadably adjustable along a thread path 110 cast or cut into the waveguide. The screws 108 are adjustable toward and away from each other from aperture fully closed to aperture fully open positions. Two screws 108 are shown for performing this adjustment, however, it should be understood that one screw 108 of sufficient width and length could be adjusted to completely open or close the aperture. It should be further understood that any other suitable means or method may be utilized to selectively change the aperture's physical size and control the radio frequency energy passing through the aperture.

OPERATION

It is pointed out that the cross-section shown in FIG. 3 of the transmitter and receiver diodes together with their mounting parts apply equally to FIG. 6, i.e., the mounting hardware is identical except that the bosses in FIG. 6 are shown in a square cross-sectional configuration as opposed to the circular cross-sectional configuration of FIG. 1. The coupling aperture 87 in the embodiment of FIGS. 6–9 is shown having a different geometry than that of the coupling aperture 17 of the embodiment of FIGS. 1 and 2 due to the different transmission characteristics of a completely split waveguide and horn configuration of the embodiment of FIGS. 6–9. Also, the FIGS. 1, 2, 6, 7, and 8 are illustrated with the transmitter and receiver diodes and their respective mounting parts uninstalled for clarity.

Referring to FIGS. 1 and 2, it can be seen that if a transmitter diode disposed within transmitter boss 19 and waveguide section 13 is excited, it will radiate to the right due to the geometry of the waveguide. A minimum amount of energy is coupled into the area of the receiving boss 22 with substantially all of the energy being coupled to the output port 30 of the common waveguide section 24. The amount of energy that is seen at the receiver then becomes the local oscillator of the radar system. When reflected energy is passed back down the common waveguide section 24 it will see a short looking toward the transmission waveguide section 13 since there is an even number of quarter wavelengths from the shorting end surface 21. Hence, received energy will pass through coupling port 17 into the receiving waveguide section 14. Coupling aperture 17 in this regard has the function of a directional coupler. Adjustment screw 18 adjusts the amplitude of the coupled transmission energy establishing the amplitude level of the local oscillator in the radar system. Referring to FIG. 4, a horn radiator is shown for wide angle radiation and, referring to FIG. 5, a disc reflector is shown for a narrower radiation beam.

Referring to FIGS. 6-11 and 13-15, a completely split transmission line is illustrated which in effect follows the identical theory of the embodiment of FIGS. 1 and 2, and is shown with a radiating horn as part of the main casting. Aperture adjustment is again shown at 94 with coupling tuning accomplished by either fine adjustment screw 96 or by aperture size adjustment screws 108. Here the distance between the receiving diode and the coupling aperture is less critical because of the double horn configuration than it was in the embodiment of FIGS. 1 and 2.

Referring to FIGS. 3 and 12, mounting of the transmitting diode is accomplished by grounding the upper diode contact within upper diode mount 32 and insulatively passing the lower diode contact to the external contact 43 through conductive sleeve 36 which is held within a mounting aperture 37 by mounting RF bypass disc 38 and insulating clamp 41. It is pointed out that bypass dielectric 39 forms a capacitance to the transmitter mounting boss 19 for matching the input external contact 43 to waveguide section 13.

Receiving diode window 46 is shown disposed within waveguide section 14 with its upper contact 47 grounded through clamp plate 49 and clamp screws 51 to receiver mounting boss 22. The output contact 53 is coupled via coupling sleeve 52 to lower receiver contact 48 and is carried by receiver RF bypass disc 54 clamped between insulating clamp 57 and bypass dielectric 56. Bypass dielectric 56 matches the output impedence of the receiving diode to the output circuitry coupled to external output contact 53.

It should be understood, of course, that the foregoing disclosure relates to only preferred embodiments of the present invention, and it is intended to cover all changes and modifications of the example of the invention herein chosen, for the purposes of the disclosure, which do not constitute departures from the spirit and scope of the invention.

Having thus described the invention, what is claimed as new and useful and desired to be secured by Letters Patent is:

1. A doppler radar module comprising:
   a transmitting waveguide and a receiving waveguide in side by side relationship with a common wall therebetween, said transmitting waveguide having a shorted end, transmitter means based from said shorted end and an open end coupled to free space, said receiving waveguide having a shorted end and a receiver means spaced therefrom; and
   an aperture disposed in said common wall, said aperture operable for coupling a portion of any transmitted energy into said receiving waveguide.

2. The invention as defined in claim 1, wherein said aperture additionally comprises means for selectively controlling the strength of the coupled energy.

3. The invention as defined in claim 2, wherein said means for selectively controlling the strength of said coupling comprises at least one screw threadedly engaging said waveguide.

4. A doppler radar module comprising:
   a curvilinear transmitting waveguide and a curvilinear receiving waveguide in side by side relationship with a common wall therebetween, said transmitting waveguide having a shorted end, transmitting means based from said shorted end and an open end coupled to free space, said receiving waveguide having a shorted end and a receiver means spaced therefrom; and
   an aperture disposed in said common wall, said aperture operable for coupling a portion of any transmitted energy into said receiving waveguide.

5. The invention as defined in claim 4, wherein said curvilinear waveguide is substantially circular.

6. The invention as defined in claim 4, wherein said curvilinear waveguide is substantially elliptical.

7. The invention as defined in claim 5, wherein said aperture additionally comprises means for selectively controlling the strength of the coupled energy.

8. The invention as defined in claim 7, wherein said means for selectively controlling the strength of said coupling comprises at least one screw threadedly engaging said waveguide.

9. A doppler radar module comprising:
   a rectangular transmitting waveguide and a rectangular receiving waveguide in a side by side relationship with a common wall therebetween, said transmitting waveguide having a shorted end, transmitter means based from said shorted end and an open end coupled to free space, said receiving waveguide having a shorted end and a receiver means spaced therefrom; and
   an aperture disposed in said common wall, said aperture operable for coupling a portion of any transmitted energy into said receiving waveguide,
   said aperture additionally comprising means for selectively controlling the strength of the coupled transmitted energy, said means comprising a pair of opposed screw members threadedly engaging said waveguide adjacent said aperture.

10. The invention as defined in claim 9, wherein each one of said pair of opposed screw members is threadedly adjustable through a range of substantially one-half the length of said aperture.

* * * * *